June 9, 1931. J. L. PORTER 1,808,969
METER SEAL
Filed Nov. 17, 1928
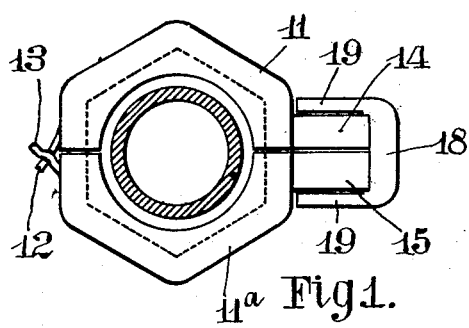
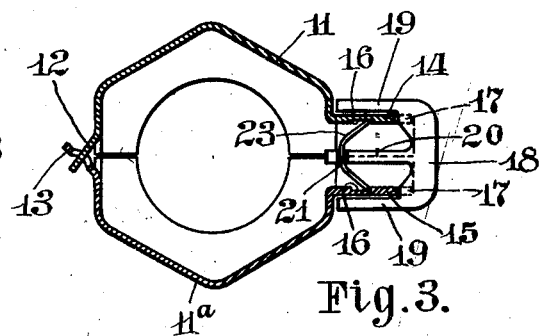
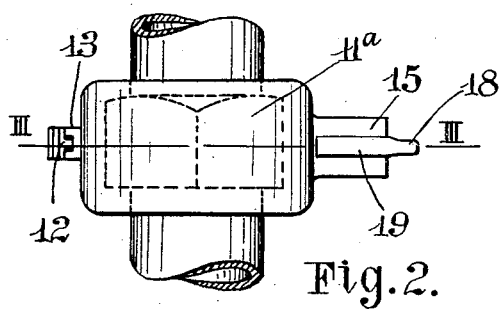
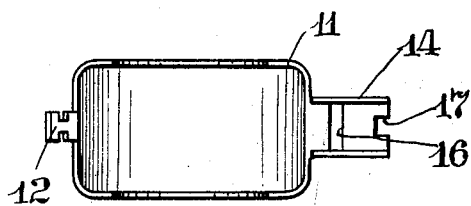
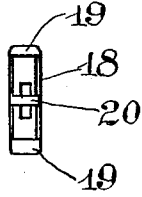
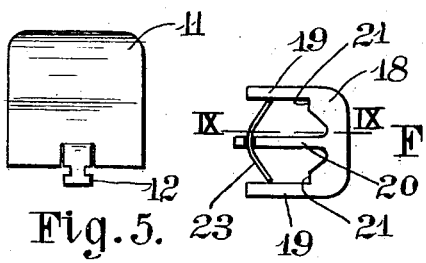
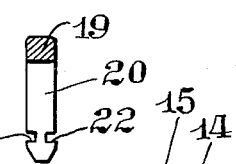
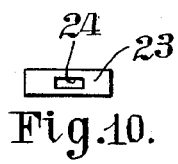
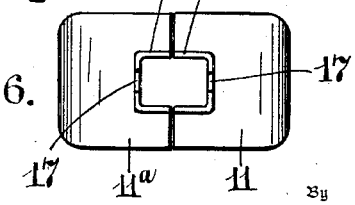
Inventor
JOHN LAWRENCE PORTER
Attorneys Patented June 9, 1931

1,808,969

UNITED STATES PATENT OFFICE

JOHN LAWRENCE PORTER, OF COLUMBUS, OHIO

METER SEAL

Application filed November 17, 1928. Serial No. 320,072.

This invention relates more especially to devices of the kind that are commonly called meter seals and are secured around the couplings of pipes where they enter meters to detect unauthorized access to and manipulation of the couplings for the purpose of unlawfully appropriating the gas, water or other supply flowing through the pipe.

Such devices ordinarily comprise a pair of shells adapted when properly placed together to inclose the coupling, said shells being hooked or secured together at one end and secured together at the other end by a frangible key; and the object of the present invention is to make improvements in both the shell and key whereby the unlawful separation of the shells is rendered more difficult and obvious. Other objects are to simplify and lessen the cost of manufacturing such devices.

The invention is embodied in the example herein shown and described, the features of novelty being finally claimed.

In the accompanying drawings—

Figure 1 is a side view of the seal according to my invention as the same appears on a coupling, the pipe being in cross section.

Fig. 2 is a top plan view of the device as seen in Fig. 1.

Fig. 3 is a section on the line III—III Fig. 2.

Fig. 4 is a view looking toward the interior of the upper shell section of Figs. 1 or 2.

Fig. 5 is a view of the left hand end of the shell section shown in Fig. 4.

Fig. 6 is a view of the neck end of the connected sections with locking or sealing key not inserted.

Fig. 7 is a side view of the sealing or locking key alone.

Fig. 8 is a view looking toward the left hand end of Fig. 7.

Fig. 9 is a section on the line IX—IX Fig. 7.

Fig. 10 is a plan view of the spring catch used in the key.

In the views 11 and 11ª designate the shell sections for inclosing the pipe coupling. These sections are preferably made of pressed sheet steel. The shell section 11 is formed at its rear end with a bent out tongue 12 having a T-shaped end, and the section 11ª has at the corresponding end a bent out tongue 13 formed with a slot of such form and position that to connect the shell sections it is necessary to turn one of the shells on the axis of its neck portion and out of coupled position to engage the T-shaped tongue 12 with the slotted tongue 13. After they are so engaged the shell sections can be placed in complementing position to enclose the couplings as seen in Figs. 1, 2 and 3. This construction involves the disfigurement or destruction of one or both of said tongues if it be attempted to separate the sections at that end while the shell sections are locked in a coupling sealing position.

The forward end of each of the shell sections is formed with a neck section as shown at 14 and 15, each being of channel form and preferably each having a transverse groove as at 16 and each having a notch 17 in its end.

The "key" or ultimate securing device for the shells comprises a head portion 18 from which extends end legs 19 spaced to go over the outer faces of the neck sections when the latter are closed and a middle leg 20. The head 18 is formed with shoulders or legs 21 at the junction of the legs 19 therewith; and the middle leg 20 is made with a tapered terminal T-end being formed by opposite notches 22 near the end of said leg. This portion of the key is frangible and advantageously of cast metal.

The key includes a flat metal spring 23 perforated with a slot 24 adapted to permit the spring to be placed on the terminal T-end of the leg 20 and given a quarter turn at the notches 22 with the opposite ends of the spring engaging the inner sides of the legs 19. By this means the spring is held from loss in position to be applied to the neck sections of the seal. The key thus constructed is applied to the neck sections when closed as shown in Fig. 6 by pressing it so that the shoulders 21 will enter the notches 17 and the ends of the spring engage the notches 16. The notches 16 can be dispensed with if the biting effect of the ends of the spring on the inner walls of the neck is sufficient to prevent the withdrawal of the key when inserted and, ordinarily it will be.

Because the legs 19 embrace the outer sides of the neck in a plane at right angles to the line of division between the neck sections of the shells, said shells cannot be separated in the direction of the plane of said legs; and because the shoulders 21 enter the notches 16 the shells cannot be separated in a plane coinciding with the line of division between the neck sections, hence when the key is in place the shells can only be separated by the destruction of the cast metal portion of the key, which, of course, affords the evidence if unlawfully tempered with.

The forms of the parts can be changed without departing from the gist of the invention as claimed.

What I claim is:

A sealing device for pipe couplings including a pair of shells having neck members, said neck members provided with notches in their ends and notches in their inner faces, a key for latching said neck members together including legs to lie opposite the outer faces of said neck members and means on the key to engage said end notches, an intermediate leg carrying a spring to engage the notches of the inner faces of said neck members.

JOHN LAWRENCE PORTER.